United States Patent [19]

Ernst

[11] 4,060,254
[45] Nov. 29, 1977

[54] IMPLEMENT RE-ALIGNMENT HITCH

[76] Inventor: Arnold E. Ernst, Wolverton, Minn. 56594

[21] Appl. No.: 648,413

[22] Filed: Jan. 12, 1976

[51] Int. Cl.² ............................................. B60D 1/14
[52] U.S. Cl. ............................... 280/461 A; 172/446; 172/667; 172/679; 172/741
[58] Field of Search .......... 280/456 A, 456 R, 461 A, 280/461 R, 460 A, 460 R, 467, 472; 172/446, 476, 741, 305, 646, 667, 679

[56] References Cited

U.S. PATENT DOCUMENTS

| 1,951,376 | 3/1934 | Strandlund | 172/476 X |
| 2,698,563 | 1/1955 | Edwards | 172/446 X |

FOREIGN PATENT DOCUMENTS

| 213,123 | 6/1960 | Austria | 172/446 |
| 1,019,457 | 10/1952 | France | 172/667 |
| 1,071,395 | 12/1959 | Germany | 172/446 |

Primary Examiner—Joseph F. Peters, Jr.
Assistant Examiner—John A. Pekar
Attorney, Agent, or Firm—Henderson, Strom & Sturm

[57] ABSTRACT

Apparatus for maintaining an implement which is coupled to a tool bar in a controlled position behind a prime mover, having a pair of rock arm devices each including a rod coupled to the bottom lift arms of the tractor's three-point hitch, each of the rods being rotatably received by a sleeve upon which is mounted a normally upright plate. Positioned a distance above the sleeve on the plate is a second rod extending rearwardly and rotatably received by a second sleeve. The second sleeve is rigidly secured to the tool bar by a bracket device. A cylinder and piston having one end of the cylinder pivotally fastened to the tool bar and the piston pivotally fastened to the nearest plate, with a rod coupling both plates together. As the piston expands and contracts relative to the cylinder, the tops of the plates are displaced in the same direction. The second sleeve will be displaced in the same direction as its plate, thereby causing the tool bar, which is coupled to the sleeves by the bracket assembly, to be displaced in the same direction, which will laterally displace the implement the same distance, relative to the prime mover.

8 Claims, 7 Drawing Figures

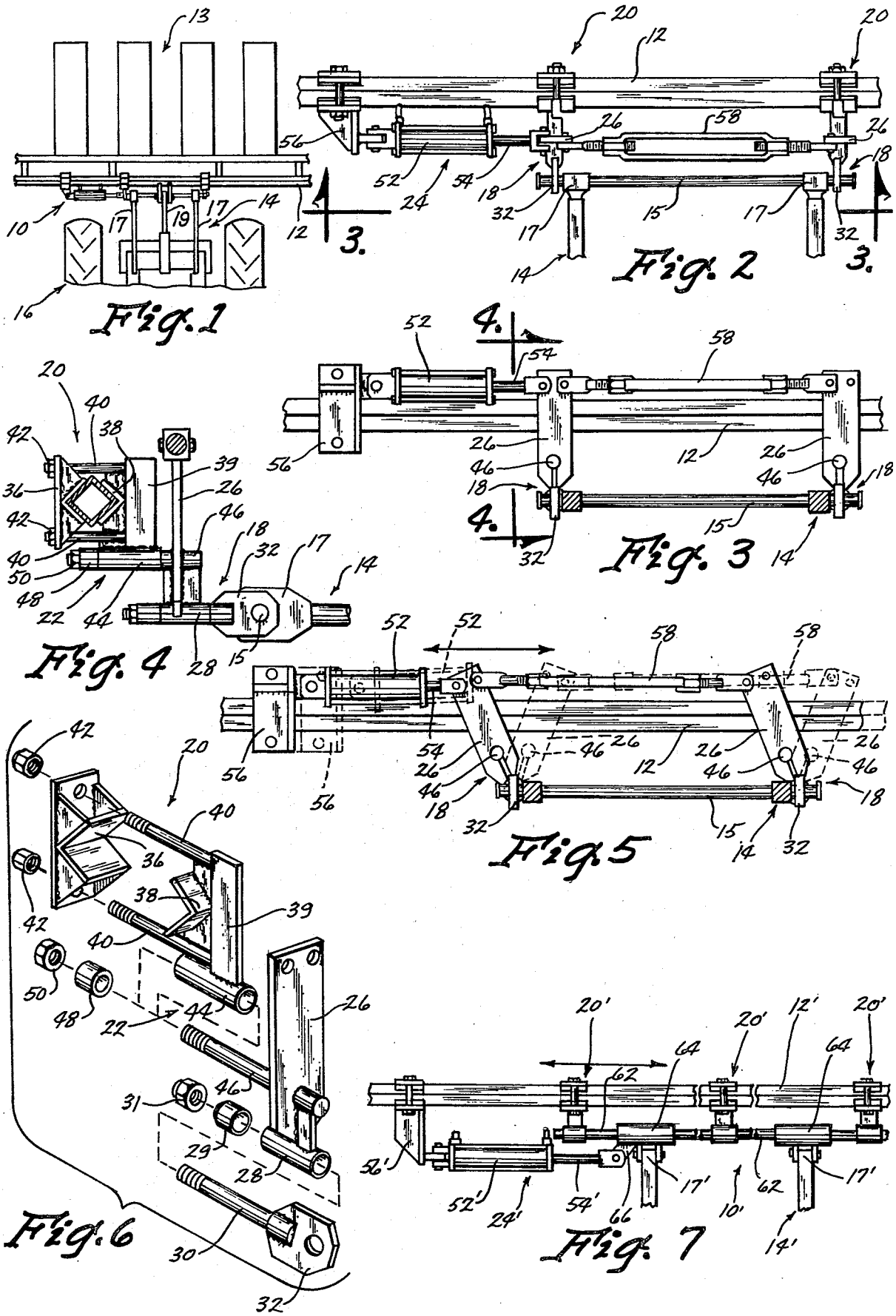

IMPLEMENT RE-ALIGNMENT HITCH

BACKGROUND OF THE INVENTION

The present invention relates in general to a farm implement hitches; and, in particular, to hydraulically controlled implement hitch for movement of the implement transverse of the direction of travel.

As a result of the increased world population and unfavorable crop productions in many countries, the burden of increased food production was placed on the U.S. farmer. In order to meet the increased need for food products, the farming industry is seeking methods of increasing the yield per acre. Further, the amount of land being tilled each year is increasing as evidenced by the gradual changeover of pasture land into tillable crop land. Much of the previously converted tillable land includes the rolling, hilly land that until recently was undesirable to be used for crop purposes. Working on rolling, hilly terrain creates many problems that are not associated with level land tillage. Until recently, because the majority of crop production was on semi-level land, farming equipment was designed for use primarily on level land. Therefore, the use of existing farming equipment on hilly, rolling terrain is currently producing problems.

A serious problem involves the downhill shifting of the implement when working transverse of the incline. Ideally, tilling the soil transverse of the incline is preferred since it does not further add to the water management problem by creating downward running furrows. The tractor, being easably controllable, maintains the proper straight alignment on inclines; however, the implement tends to shift downhill behind the tractor as it moves transversely across the incline.

This is particularly troublesome when cultivating where running off the row by as little as one half of an inch will cause the cultivator to plow up the plants and/or severely damage the root structure. Further, if the downhill shifting occurs during planting, and guide furrows are used, intentional running off becomes necessary during later tillage in order to maintain proper alignment with the rows. Therefore, downhill shifting is a serious problem.

Most farmers are switching to the tool bar implement combination. Therefore, the obvious solution to the problem would be realigning the individual implements to offset the shifting. In order to realign the implements, they must each be individually loosened from the tool bar, realigned and then retightened onto the tool bar. This procedure, while being satisfactory by alleviating the problem of misalignment because of downhill shifting, is very time consuming since tillage on hilly terrain is normally accomplished by a series of successive rows transverse the direction of incline and tilled in opposite directions. This procedure would require the operator, upon reaching the end of a row where he would normally turn around to proceed in the opposite direction for the next row, to again loosen the implement from the tool bar and realign them to offset the downhill shift that will occur on the opposite side of the implement. Furthermore, since the downhill shifting of the implement would constantly be changing with respect to the incline of the ground, the operator may have to stop to realign the implement more than once per each single row. This naturally would add more time to the tilling process.

The manual realignment of the implement becomes even more unrealistic when considered in light of the fact that the increased size of farming equipment, it is now possible to perform several operations to the land at the same time, including conditioning, planting, and fertilizing in one operation. If several operations were being carried out at the same time on hilly terrain where downhill shifting is a problem, each individual implement would have to be realigned, which could feasibly take more time than the actual tilling of the land.

Therefore, there is a definite need for a device which permits quick, accurate, and each realignment of an implement or a series of implements when tilling on rolling terrains.

SUMMARY OF THE INVENTION

In accordance with the present invention, a hydraulically controlled implement hitch is fastened to the implement by a tool bar and to the three-point hitch of the prime mover. A pair of rock arm devices is provided with each including a normally upright plate with a sleeve fastened to the bottom end of the plate. The sleeve rotatably receives a rod which is adapted to be pivotally connected to the lower end of the lift arm portion of the three-point hitch. The sleeve and rod are extended in the direction of travel of the prime mover and the plate is pivotally movable in a vertical plane.

A second rod is positioned above the sleeve and extends in a rearward direction and is fastened to the plate. A second sleeve rotatably receives a second rod and the second sleeve is securely fastened to the tool bar by bracket devices mounted on the tool bar. A cylinder and piston with one end of the cylinder pivotally fastened to the tool bar and the piston pivotally fastened to a plate with an adjustable rod interconnecting the plates, form the plate moving device. When the piston expands and contracts relative to the cylinder, the plates will be displaced in the same direction as the piston moves. As the plates move, the second sleeve mounted on the rod that is secured to each plate will also be displaced in the same direction. The tool bar directly connected to the second sleeve will then be displaced the same distance and direction as the second sleeve, thereby controllably displacing the implement connected to the tool bar.

It is thus an object of the invention to provide a controlled implement hitch which is capable of controllably displacing the implement transverse to the direction of movement of the implement.

Another object of the invention is to provide a controlled implement hitch which is capable of making very fine and precise adjustments to the position of the implement with respect to the prime mover.

A further object of the present invention is to provide a controlled implement hitch which is simple to use and easy to install.

Still another object of the present invention is to provide a controlled implement hitch which may be remotely controlled.

Still another object of the present invention is to provide a controlled implement hitch which is sturdy and capable of operating under high stress conditions.

Other objects, advantages, and novel features of the invention will become apparent from the following detailed description of the invention when considered in conjunction with the accompanying drawings.

BRIEF DESCRIPTION OF THE DRAWINGS

FIG. 1 is a fragmentary plan view of the hydraulically controlled implement hitch coupled between the tractor's three-point hitch and the tool bar of the implement;

FIG. 2 is a plan view of the hydraulically controlled implement hitch coupled to the lower lift arms of the tractor's hitch;

FIG. 3 is a side view taken along lines 3—3;

FIG. 4 is a vertical cross-sectional view taken along lines 4—4;

FIG. 5 is an elevational view wherein solid lines illustrate the position of the implement hitch and the tool bar shifted to the left and dotted lines illustrate the position thereof shifted to the right;

FIG. 6 is an exploded view of a rock arm device, a bracket device, and a bracket connection element; and FIG. 7 is a top view of the second embodiment of the present invention.

DESCRIPTION OF THE PREFERRED EMBODIMENT

Referring now to the drawings wherein like reference numerals designate identical or corresponding parts throughout the several views, FIG. 1 illustrates an improved and novel hydraulically controlled implement hitch 10 of this invention. The hitch 10 (FIGS. 2 and 4) is coupled between a tool bar 12, to which is rigidly fastened the implement 13, and a conventional three-point hitch 14. The three-point hitch 14 extending behind the prime mover 16 includes a draw bar 15 pivotally connected to the lower lift arm 17 and an upper lift arm 19 connected to the tool bar 12. As shown in FIG. 1, the upper lift arm 19 is arranged centrally of the lower lift arms 17; and is connected to the center section of the tool bar 12 by a bracket structure. To facilitate clarity in the drawings, the upper lift arm 19 is not shown other than in FIG. 1.

As illustrated in FIGS. 2-6, the hitch 10 includes a pair of rock arm assemblies 18, which are connected to the lower lift arm 17 of the three-point hitch 14. The hitch 10 further includes a pair of bracket units 20, which are secured in a spaced relation on the tool bar 12; two bracket connection elements 22, each of which is secured to a bracket unit 20 and a plate moving device 24 for moving the two rock arm assemblies 18, will be described in more detail hereinafter.

Specifically, each of the rock arm assemblies 18 (FIGS. 2, 4, and 6) include a plate 26 with a sleeve 28 fastened to the bottom end of the plate 26. The sleeve 28 rotatably receives a rod 30 which has a cap 32 which is adapted for connection to the three-point hitch 14 on a lower lift arm 17 (FIG. 2). A spacer 29 and nut 31 are affixed to the other end of the rod 30 to prevent it from sliding out of the sleeve 28. The plates 26 are normally disposed in an upright position and the sleeves 28 and rods 30 are normally extended in the direction of travel of the prime mover 16. This arrangement permits the plates 26 to be pivotally movable in a vertical plane.

The bracket devices 20 (FIGS. 4 and 6) specifically include a first element 36 and a second element 38 which have right angular formed sockets. The elements 36 and 38 are aligned opposite each other on the tool bar 12 in a nesting arrangement. The second element 38 of the bracket devices 20 include a pair of threaded rods 40 which are rigidly secured to element 38 and pass over the top and bottom of the tool bar 12 and through openings in the element 36. The rods 40 firmly hold the two bracket elements 36 and 38 together against the tool bar 12 and nuts 42 are used to secure the element 36 to the rods 40. The element 38 further includes a plate 39 which is rigidly affixed to element 38 and the end of rods 40 and in an upright position as illustrated in FIGS. 4 and 6.

The bracket connection elements 22 (FIGS. 4 and 6) include a second sleeve 44 and second rod 46. The second sleeve 44 is rigidly affixed to a bottom of the plate 39 and positioned parallel to sleeve 28. The rod 46 is rigidly affixed at its forward end to the plate 26 and is rotatably received by the sleeve 44. A spacer 48 and nut 50 are affixed to the end of rod 46 to prevent the rod 46 from sliding out of the sleeve 44. The rod 46 is positioned above the sleeve 28. The longitudinal axes of both sleeves 28 and 44 and rods 30 and 46 are parallel; and, with the plates 26 in their normal upright position, the longitudinal axes of the sleeves 28 and 44 and rods 30 and 40 are parallel and in the same vertical plane.

The plate moving device 24 (FIGS. 1-3 and 5) includes a double acting hydraulic cylinder 52 having an internal piston 54. The cylinder 52 may be operated from the hydraulic system of the prime mover 16. The cylinder 52 is pivotally connected to the tool bar 12 by a bracket 56 and lies parallel to the tool bar 12. The piston 54 is pivotally connected to the upper portion of one of the plates 26. An adjustable rod 58 is pivotally connected to both of the plates 26 and it will be noted that the connection of the rod to the plate is at equal distances above the sleeve 44. In the preferred embodiment, the rod 58 is positioned near the top of each plate 26. In this position, the plates 26 will exert the least amount of force on the rod 58; however, the invention may be practiced with the rod 58 being positioned lower on the plates 26 but above the sleeve 44. The rod 58 forms the top of a parallelogram with the sides being formed by the plates 26 and the draw bar 15 being the bottom. In the event a draw bar 15 is used having a length different from the conventional draw bar, the length of the rod 58 may be adjusted accordingly in order to maintain the structural shape of the parallelogram.

As discussed above, when the implement 13 is moved over an inclined surface, the implement 13 will shift downward with respect to the prime mover 16. To correct the alignment of the implement 13, the hitch 10 is displaced from the normal position as illustrated in FIG. 3 to a displaced position as illustrated in FIG. 5. This is accomplished by moving the piston 54 in or out of the cylinder 52. Since the piston 54 is directly coupled to the plates 26, its expansion or retraction from the cylinder 52 is followed by the identical movement by the top of the plates at the point where the piston 54 is connected thereto. As the plates 26 are moved, they rotate on the sleeve 28 and an axis defined by the longitudinal center of rod 30. With the tool bar 12 being carried by the bracket connection elements 22 and the rods 46 being rigidly connected at one end to the plates 26, and lateral movement of the plates 26 will result in the rods 46 being displaced in the same direction which, in turn, will displaced the tool bar 12 in the same direction, thereby moving the implement.

This is exemplified in FIG. 5 where the solid lines illustrate the invention when the piston 54 is retracted into the cylinder 52. This results in the tool bar 12 being shifted in the same direction as the piston 54 was retracted. The dotted lines illustrate the position of the invention when the piston 54 is extended from the cylinder 52 with the tool bar 12 being shifted in the opposite direction.

The amount by which the tool bar 12 is shifted in response to the movement of the piston 54 is determined by the distance on the plates between the placement of the bracket connection elements 22 with respect to the axis of rotation as defined by the longitudinal axis of rod 30 as compared to the distance between the axis of rotation and the point at which the piston 54 is connected to the plate 26. Generally, this ratio will be less than one, which, for example, if the ratio was 0.5, then for a movement of the piston of 8 inches, the tool bar 12 would move 4 inches in the same direction.

A second embodiment 10' of the present invention is illustrated in FIG. 7 wherein identical elements will be identified by the same reference numerals used to identify the embodiment with a prime notation placed above them. A rod 62 is rigidly spaced from the tool bar 12' and parallel thereto by bracket units 20'. A pair of sleeves 64 are pivotally coupled to the lower lift arm 17' of the three point hitch 14' and slidably received the rod 62. The upper lift arm 19' (not shown) of the three point hitch 14' is also coupled to the tool bar 12' in a similar manner as described above in reference to the first embodiment. The piston and cylinder 54' and 52' respectively are pivotally coupled to the tool bar 12' by the bracket assembly 56' and positioned parallel to the tool bar 12'. The piston 54' is pivotally connected by a link 66 to the sleeve 64. When the piston 54' either expands out of our contracts into the cylinder 52', the tool bar 12' will be displaced in the same direction and the same distance as the piston 54' is moved, thus displacing the implement in the same direction.

Obviously, many modifications and variations of the present invention are possible in light of the above teachings. It is therefore to be understood that, within the scope of the appended claims, the invention may be practiced otherwise than as specifically described.

I claim:

1. Apparatus for maintaining an implement having a tool bar in a controlled position behind a prime mover having a conventional three-point hitch arrangement with a draw bar including an upper arm and a pair of lower lift arms, the upper arm pivotally connected to a mounting device secured to a tool bar, said apparatus comprising:

a pair of rock arm means, each of which includes an upright plate, each plate adapted to be connected at its lower end to a respective lower lift arm, said rock arm means being mounted for movement transverse of the tool bar;

a pair of bracket devices, each bracket device secured to the tool bar in a spaced relationship thereon;

means rotatably connecting each bracket device to a respective plate at a point on said plate intermediate the ends thereof; and means for moving said plates simultaneously including a fluid operated piston and cylinder device, one end of which is pivotally connected to the tool bar and the other end of which is operatively connected to said plates at their upper ends, said plates moved normally in a vertical plane about their lower ends, whereby said plates above their lower ends move in a direction normal to the direction of movement of the prime mover.

2. Apparatus as defined in claim 1 wherein each of said rock arm means further includes a sleeve and a connecting rod, said sleeve fastened to the bottom end of said plate and rotatably receiving said rod therein, said rod adapted to be pivotally connected to a lower lift arm, said sleeve and said rod extended in the direction of travel of the prime mover.

3. Apparatus as defined in claim 2 and further including bracket connection means, including a second sleeve and a second rod, said second rod secured to said plate and rotatably extended into said second sleeve, said second rod and second sleeve extended in the direction of travel of the prime mover and said second rod positioned on said plate above said first sleeve.

4. Apparatus as defined in claim 3 wherein said plate moving means include a connecting rod pivotally connected to and extended between each of said plates, said connecting rod connected to said plates at positions thereon and spaced equally above said second rods.

5. Apparatus as defined in claim 1 wherein said bracket connection means includes a second sleeve and a second rod, said second rod secured to said plate and rotatably extended into said second sleeve, said second rod and second sleeve extended in the direction of travel of the prime mover.

6. Apparatus as defined in claim 5 wherein said second rod in positioned on said plate above said first sleeve.

7. Apparatus as defined in claim 6 wherein said plate moving means includes a connecting rod pivotally connected to and extended between each of said plates.

8. Apparatus as defined in claim 6 wherein said connecting rod is connected to said plates and positioned thereon spaced equally above said second rods.

* * * * *